(12) United States Patent
Minemura et al.

(10) Patent No.: US 6,558,243 B2
(45) Date of Patent: May 6, 2003

(54) METHOD OF SEPARATING MEAT OF A POULTRY WITH BONES AND APPARATUS FOR USE IN SUCH METHOD

(75) Inventors: Takehisa Minemura, Tokyo (JP); Daisuke Asaka, Tokyo (JP); Shouzou Kouzu, Tokyo (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/925,026

(22) Filed: Aug. 9, 2001

(65) Prior Publication Data

US 2002/0102932 A1 Aug. 1, 2002

(30) Foreign Application Priority Data

Jan. 30, 2001 (JP) .................................. 2001-020922

(51) Int. Cl.⁷ ............................................. A22C 21/00
(52) U.S. Cl. ..................... 452/149; 452/153; 452/155
(58) Field of Search ................... 452/135, 153, 452/155, 167, 170, 149

(56) References Cited

U.S. PATENT DOCUMENTS

| | | | |
|---|---|---|---|
| 4,385,421 A | * 5/1983 | Martin | 452/170 |
| 4,558,489 A | 12/1985 | Mil | |
| 4,669,148 A | 6/1987 | Scheier | |
| 5,015,213 A | 5/1991 | Hazenbroek | |
| 5,429,549 A | * 7/1995 | Verrijp et al. | 452/154 |
| 5,947,811 A | * 9/1999 | Hazenbroek et al. | 452/154 |
| 6,004,199 A | * 12/1999 | Habenicht et al. | 452/166 |
| 6,322,438 B1 | * 11/2001 | Barendregt et al. | 452/155 |

FOREIGN PATENT DOCUMENTS

| | | | | |
|---|---|---|---|---|
| EP | 0485038 A1 | * | 5/1992 | ........... A22C/21/00 |
| JP | 515299 | | 1/1993 | |
| JP | 5184281 | | 7/1993 | |
| JP | 793861 | | 10/1995 | |

* cited by examiner

Primary Examiner—Charles T. Jordan
Assistant Examiner—Susan C. Alimenti
(74) Attorney, Agent, or Firm—Crowell & Moring LLP (57) ABSTRACT

A process for separating the hollowed body of a poultry carcass into a lower half body including the thighs and part of the back, and a upper half body including the breast inclusive of the ribs and the remaining part of the back, including a first process step in which the hollowed body is cut from the roots of the thighs through the tail ends of the ilia while the hollowed body is transferred in a suspended state without cutting the keel, and a second process step in which the sinews and connective tissues are cut at the side of the hipbone and the thighs are ripped off with high yields. Apparatus for the first step includes a conveyer line 20a, a peritoneum cutting part 11, a 90 degree reversing part 12, and a poultry carcass severing part 13. Apparatus for the second step includes a toothed conveyer with a lower belt which transfers the lower half body hooked at the hipbone, a parallel running conveyer provided under the toothed conveyer for ripping and carrying out the thigh of the lower half body, and a pair of parallel guide plates provided under the lower belt, the lower half body including the hipbone and thigh being transferred clasped between the parallel guide plates and the lower belt.

8 Claims, 7 Drawing Sheets

LOWER SIDE RUNNING BELT

METHOD OF SEPARATING MEAT OF A POULTRY WITH BONES AND APPARATUS FOR USE IN SUCH METHOD

BACKGROUND OF THE INVENTION

1. Field of the Invention

The present invention relates to a method of separating the meat of a poultry with bones and an apparatus for use in such method consisting; a first process step for separating the hollowed body of a slaughtered poultry and the like into the lower half body including the thighs and part of the back and the upper half body including the breast inclusive of the ribs and the remaining part of the back, and a second process step for ripping off the thighs from the separated lower half body.

2. Description of the Related Art

Traditionally, a first process step for separating the hollowed body of a slaughtered poultry and the like into the lower half body including the thighs and part of the back and the upper half body including the breast inclusive of the ribs and the remaining part of the back is called a halving process. The ripping-off of the thighs from the lower half body of a slaughtered poultry separated in the halving process has been performed in an automated process as needed.

Figure 6:
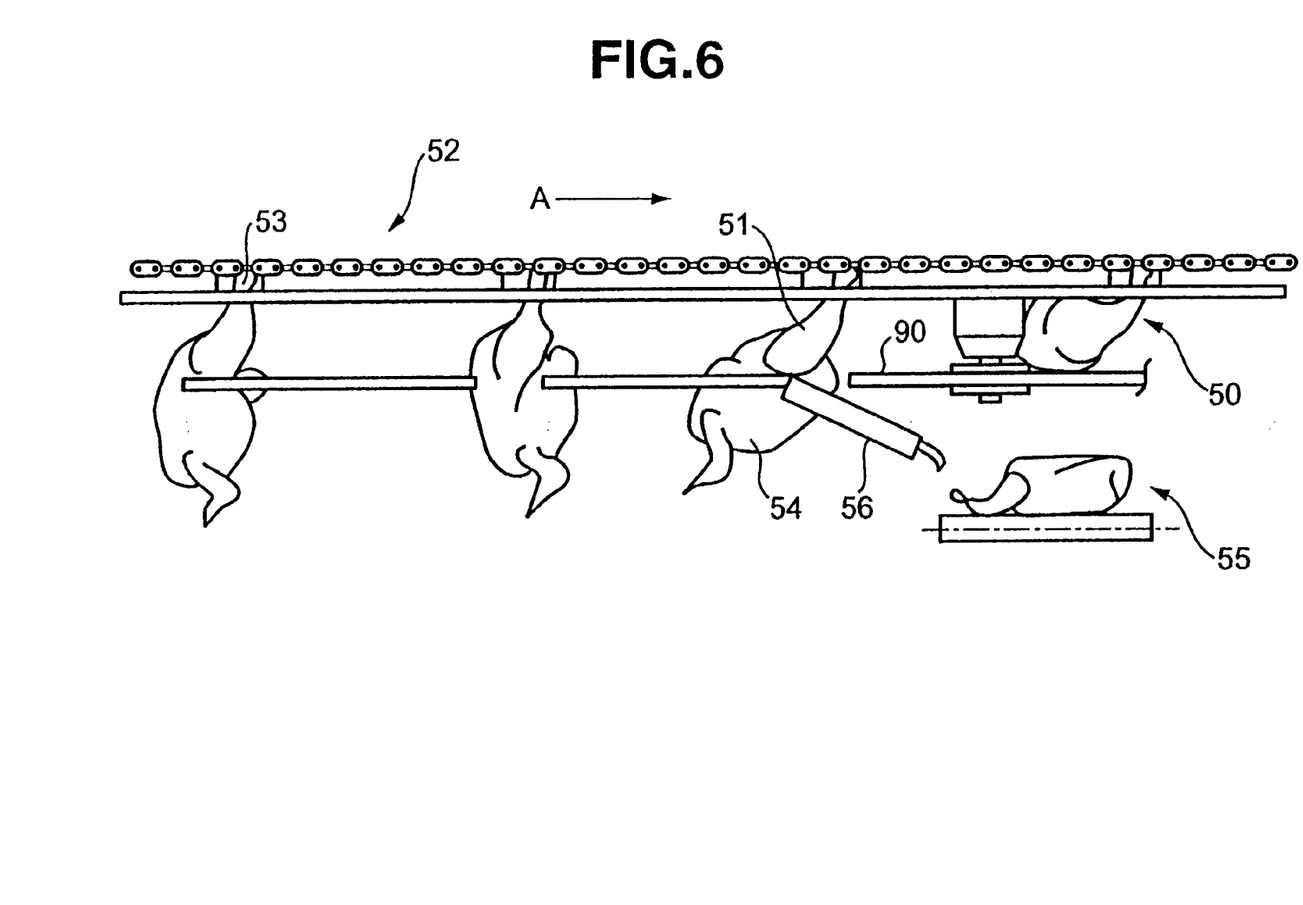
FIG. 6 is a diagrammatic view showing a conventional halving apparatus of slaughtered poultry.

The halving process of the hollowed body of a slaughtered poultry is disclosed, for example, in Japanese Unexamined Patent Publication No.5-15299. The process of separating the upper half body from the lower half body of a slaughtered poultry cited in the disclosure is, as shown in FIG. 6, a method in which the body hanging down from a conveyer 52 with its legs 53 clamped to the conveyer is separated by lateral cutting into a lower half body 50 including part of the back and the legs 53 and an upper half body 55 including the breast 54 inclusive of the ribs and the remaining part of the back. The process comprises following steps:

(a) a step wherein the body of the slaughtered poultry is allowed to take an attitude in which the legs 53 is ahead of the remaining upper half body 55 of the slaughtered poultry in the transfer direction A and the upper half body 55 is off to the lower rear.

(b) a step wherein forces directed substantially downward are exerted to both sides of the upper half body 55 to tilt it downward against the legs 53, and the position of the lateral cutting plane is set to be below the thighs 51 above the breast 54, and (c) a step wherein the body of the slaughtered poultry is separated into the lower half body hanging down from the conveyer 52 and the upper half body 55.

Thus, the separation is performed passing the step a, b, and c. Step (a) is performed by a guide means 56, the cutting position is determined in step (b), and the cutting is done with a pair of horizontal cutter 90 in step (c).

In the above mentioned method of separating the upper half body 55 from the lower half body 50, the separation is intended by the use of the guide means 56, so the method contains following problems:

(1) in order to make a space for the cutting between the keel part of the breast bone and the thighs to separate the lower half body from the upper half body, guides are necessary to exert forces to the lower half body and upper half body in the opposite direction, or a device equivalent to the guide.

(2) it is not sure that the space for the cutting is formed even if the operation cited in item(1) is done and a keel part of the brest bone may be cut off.

(3) that is, the guide as cited in item(1) is necessary to be provided preparatory to the cutting.

Figure 7A:
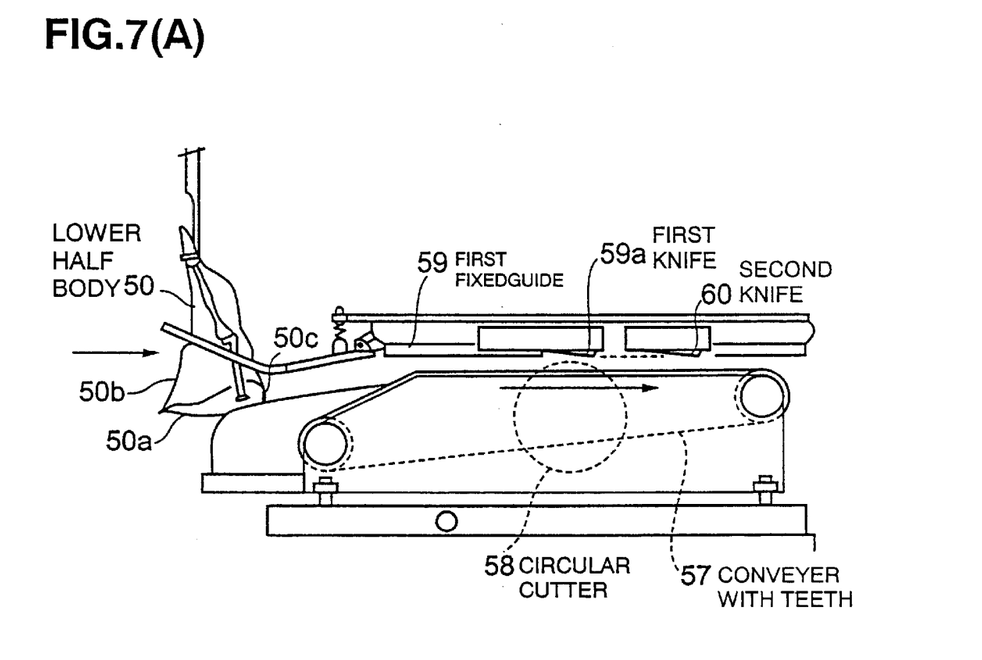
Figure 7B:
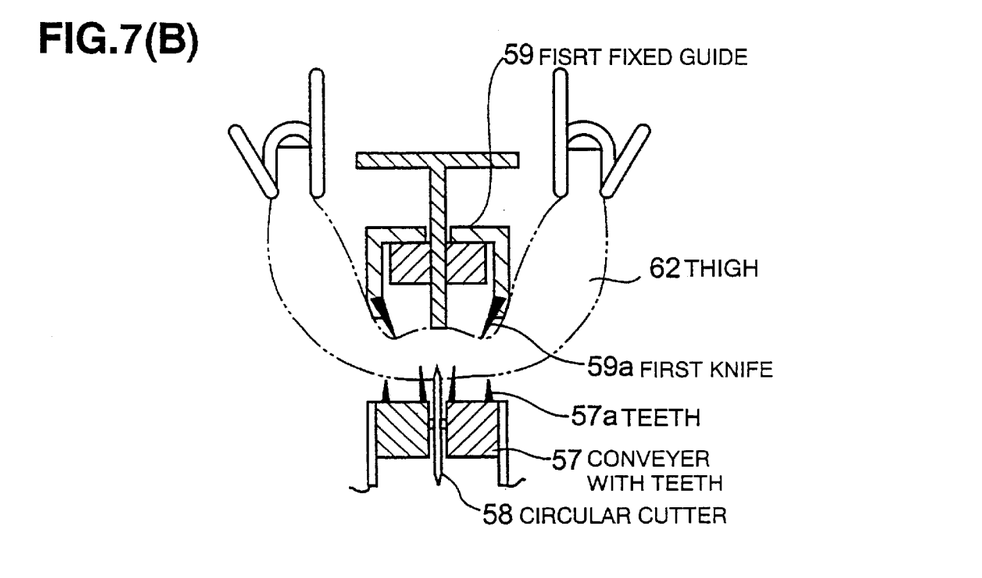

A leg processor for processing a lower half body is disclosed, for example, in Japanese Patent Publication No.7-93861. According to the disclosure, as shown in FIG. 7, the lower half body 50 of a slaughtered poultry is introduced into the apparatus with the abdomen 50b upward and the head side 50c ahead, and a streak cut is made on the dorsal side 50a with a circular cutter 58 while the work is transferred held by the teeth 57a attached to a conveyer with teeth 57.

Then, a pair of first fixed guides 59 is inserted between both thighs to make cuts with first knives 59a at both roots of the thighs(cut at the inner periphery of thigh) while preventing vertical and lateral moves of the work, succeeded by the cutting of the chords of the roots of the thighs with second knives 60.

Figure 8A:
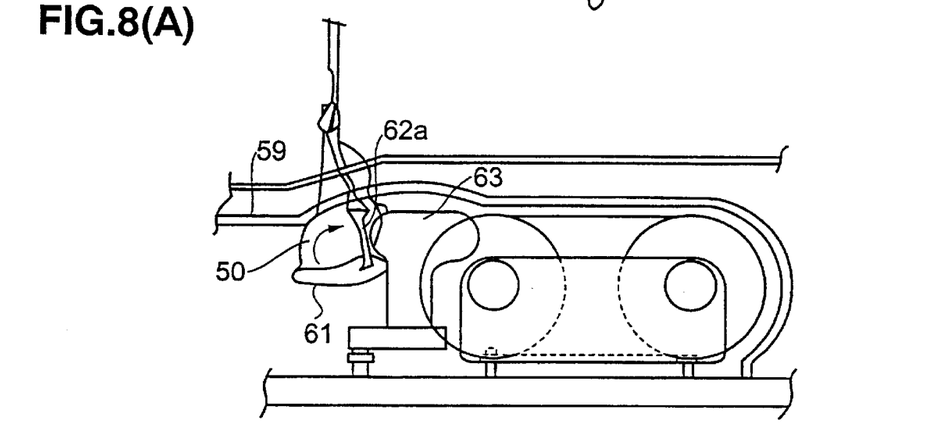
FIG. 8(A) is a views showing an early stage of the disarticulation of the hip joints and (B) is a view showing the state of the exfoliation of the ischia shown in FIG. 7.
Figure 8B:
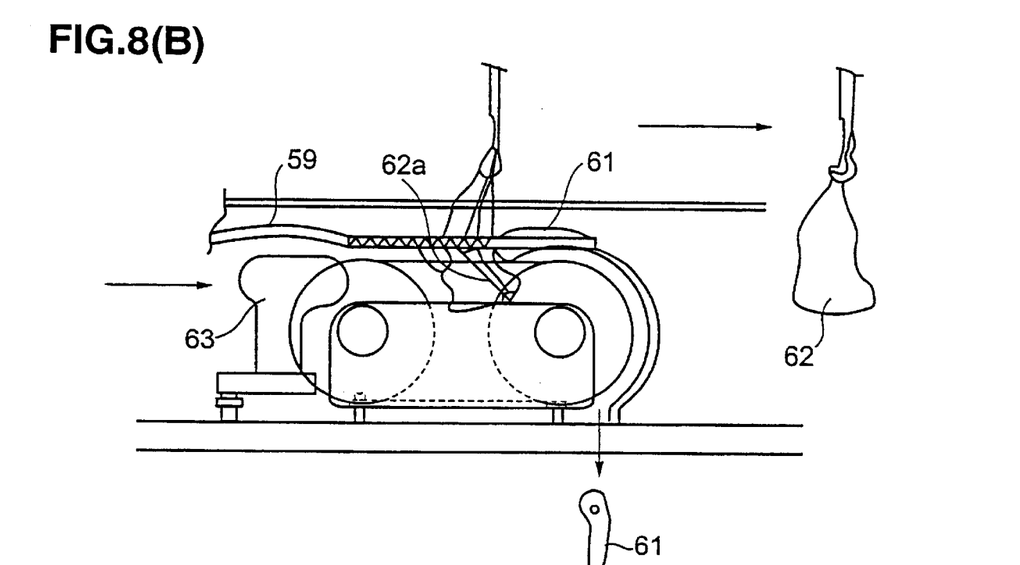

After this, each thigh is transferred to the succeeding step shown in FIG. 8, the ischium 61 is reversed by a reversing guide 63 as shown in FIG. 8(A), as a result the head side 50c is situated at the rear side in relation to the transfer direction, and the work proceeds with the thighbones(femur) twisted at the hip joints. Each thighbone 62a is disarticulated by the reversing of the ischium(joint dislocation), and the ischium 61 is separated from the thigh 62 as shown in FIG. 8(B).

In the leg processor, when the connective tissue in the region of the hip joint between the ischium and thigh is cut, a guide or the like is not fitted to the inner periphery of the ischium. Therefore, only the cut-in with the first knife at the root of the thigh is carried out without special consideration of the various shapes of curvature, which are different according to the size and form of the work, of the ischium part.

The cutting of the main chord(articular ligament) of each leg for separating each thigh from the hipbone is carried out with the second knife, but it is not always carried out at the most proper section for each sinew.

The connective tissue in the region of the hip joint (sinew at the ischium) and the articular ligament, which are different in cutting property, are cut with a cutter at the same section, which causes a lot of flesh to remain on the ischium contributing to the reduction of yields.

Further, the conventional thigh ripping apparatus(leg processor) is not provided with a rump skin cutting step (cutting of skin around the lower end part of hipbone). Therefore, the dorsal fat near the rump skin cutting part frequently remains on the bone when the thigh is ripped off from the ischium side to the ilium side. Also, the skin near the cutting part of the thigh is extended and becomes thin due to the stretching of the skin when ripped off, which contribute to the reduction of yields.

SUMMARY OF THE INVENTION

The object of the present invention is to provide, in the case of separating hollowed body of a slaughtered poultry ant the like into the lower half body including the thighs and a part of the back and the upper half body including the breast inclusive of the ribs and the remaining part of the back, a halving method in which the hollowed body is cut from the roots of the thighs through to the tail end of the ilia at the back side of the hollowed body while transferred suspended by the legs irrespective of large and small of the hollowed body without breaking the keel of the breast bone, and further a method of separating the meat of a poultry with bones and an apparatus for use in such method in which the ripping of the lower half body separated by the halving method is performed properly and with high yields owing to the exact ischium cutting which is the main cutting operation.

The present invention provides as a first step for carrying out the halving of the hollowed body a process step for separating the hollowed body of a slaughtered poultry into the upper half body and lower half body while the hollowed body is transferred suspended from the conveyer by the legs, which is characterized in that:

the peritoneum cutting is carried out to make a cut in the peritoneum between the keel of the breast bone and the thighs, then the upper half body is raised up by a guide to cause the hollowed body to take a tilted attitude with the legs ahead of the breast, while the constricted part of the roots of the thighs is clasped obliquely from both the right and left side by a pair of guides, and a cutter is inserted from the cut made in the peritoneum between the breast and thighs and the upper half body is separated from the lower half body by cutting through the hollowed body from the roots of the thighs to the tail ends of the ilia.

According to the present invention, a cutting plane is formed from the roots of the thighs through to the end of the ilium irrespective of large and small of the hollowed body and without breaking the keel by providing a keel guide in the halving process for separating the hollowed body of a slaughtered poultry into the lower half body including the thighs and the tail ends of the ilia which are part of the back and the upper half body including the breast inclusive of the ribs and keel of the breast and the remaining part of the back.

In order to perform the above mentioned operation, the cut in the peritoneum at the lower abdomen above the roots of the thighs of the hollowed body suspended by the legs is made in a downward slanting direction, and the cutting plane for the separation is set by a pair of upward slanting guides which clasp the cut part and constricted part of the roots of the thighs by the manner described hereunder.

At the outset, the breast is raised up by a guide to cause the hollowed body to take a tilted posture with the legs ahead of the breast. Then, the constricted part of the roots of the thighs is clasped obliquely by a pair of skewed guides from the right and left side, a keel guide is introduced to the exposed keel, and a horizontal cutter is inserted from the cut in the peritoneum while the keel is pushed with the keel guide to the underside of the horizontal cutter. By the insertion of the horizontal cutter, the cutting is performed from the roots of the thighs through to the tail ends of the ilia in the back without influenced by large and small of the work. As the keel is prevented from the contact with the horizontal cutter by the guide as described above, the breakage of the keel by the cutter does not occur and the mixing of fragments to the meat is prevented.

The peritoneum cutting is performed in such a manner that the attitude of the suspended hollowed body is made to take a sideways attitude to the transfer direction of the conveyer and at the same time the line from the leg through the abdomen to the breast is kept upright by a two-stage guide, and the cutting is executed with a tilted cutter facing parallel to the transfer direction of the conveyer as the hollowed body moves with the conveyer.

Particularly, in the invention, the work is made to take a sideways attitude to the transfer direction of the conveyer, the cutter faces frontally to the transfer direction of the conveyer in a slanted posture, a two stages guide having an upper and a lower guide which touches the rump and the breast respectively is provided parallel to the transfer direction of the conveyer, the work is made to take an upright posture with the line from the rump through the abdomen to the breast substantially vertical, and the tilted cutter makes a cut in the peritoneum between the roots of the thighs of the work and the keel.

A halving apparatus used in the first process for properly performing the halving process is the one for separating the hollowed body of a slaughtered poultry suspended by the legs into the lower half and upper half body while the hollowed body is transferred characterized in that it comprises:

a conveyer line for transferring the work, the hollowed body, clamped by the legs and suspended from the conveyer;

an ankle holding shackle for clamping the legs, the shackle being provided with a rotation and fixing mechanism which rotates the work from a frontal to a sideways and from the sideways to the frontal and fixes the work at the position where rotation of the shackle is stopped;

a peritoneum cutting mechanism comprising a two-stage guide for making the sideways oriented work to take an upright attitude in which the line along the thigh through the abdomen to the breast is substantially vertical, and a tilted cutter for making a cut in the peritoneum between the keel and the thighs of the work of upright posture;

a work severing mechanism comprising a pair of skewed guides slanted upward in the transfer direction of the conveyer and clasping the constricted part of the roots the thighs for allowing the work to take a backward tilting attitude to keep horizontal the halving separation plane determined by the peritoneum cut, a pusher for pushing up the upper half body at its end part; a horizontal cutter for performing the halving separation, and a keel guide for guiding the keel downward to evade the breakage of the keel by the cutter.

As cite above, the halving apparatus which can suitably perform the first process step of the present invention comprises a conveyer line for transferring the work suspended from the conveyer; an ankle holding shackle for clamping both ankles, the shackle having a rotating function to rotate the hanging work to take a sideways or frontal attitude to the transfer direction of the conveyer and fixing function to fix the attitude of the work; a pair of skewed guides slanting upward in the transfer direction of the conveyer, a peritoneum cutting mechanism; and a work severing mechanism.

The peritoneum cutting mechanism and the upward slanted skewed guides which clasp the constricted part of the roots of thighs are auxiliary means provided for the to prevention of damage of the keel by the horizontal cutter when the work is severed.

The position for inserting the horizontal cutter is determined by the upward slanted skewed guides which clasp the constricted part of the roots of thighs without influenced by large and small of the work, and the work is severed by the horizontal cutter from the cut in the peritoneum through to the tail ends of the ilia without damaging the keel owing to the provision of the keel guide.

It is suitable that the two-stage guide consists of an upper and a lower guide for clasping the rump and the breast part is provided parallel to the conveyer line or it is formed of running belts clasping the rump and breast part and traveling with the same speed as that of the conveyer line.

The method of ripping off the thighs from the lower half body separated in the halving process is characterized in that:

the lower half body is introduced in between the lower side running belt of a conveyer with teeth and a pair of parallel guide plates, with the head part of the work, the lower half body, ahead and the back side down;

a streak cut is executed in the back side of the work with a vertical cutter provided under the pair of parallel guide plates;

then the cutting of ischia is carried out at a ischium cutting part for cutting the connective tissues in the hip joint region between the side faces of the ischia and the roots of the thighs guided by tilted plates inserted from above along the inner peripheries of the ischia;

the dislocation of the hip joints is performed by the medium of a pair of inclined guides which cause the thighs to be rotated around the hip joints;

the articular ligaments between the ilia and thighbones are cut;

the rump skin of each thigh near the caudal vertebra is cut along each hipbone after each ankle is hold by a chuck fixed to a conveyer running parallel to the conveyer with teeth in the most lower part and rotated; and following the completion of the cutting operations, the ripping of the thighs is performed by the conveyer running parallel to the conveyer with teeth in the most lower part.

The second process step for ripping the thighs from the lower half body separated in the first step is configured so that the cutting of the connective tissues in the region of the hip joints between the ischia and the thighs, which have contributed to the reduction of yields in the conventional art, is performed with high yields without influenced by large and small of the work by dividing the process from the introduction of the work to the ripping-off of the thighs into several processes and ripping the thighs after the rational operation in each process.

Particularly, the ischium cutting for cutting the connective tissues in the region of the hip joint and the cutting of the articular ligaments are not executed at the same time. The ischium cutting is done by a most proper method of cutting using a most proper cutter. The cutting of the articular ligament is done with a cutter other than that used for the ischium cutting in a most proper condition after the dislocation of the hip joint. Further, the rump skin cutting for making a cut at the integument around the caudal vertebra is executed to improve yields.

The dislocation of the hip joints is performed using the inclined guides which cause the rotation of the thighs relieved of connections other than that at the joints.

The ischium cutting of claim 5 is performed in such a manner that the contact face of each tilted guide inserted along the inner periphery of each slanted ischium for pressing the face of the ischium onto the parallel guide plate is determined as a reference plane, and the connective tissue in the hip joint region between the surface of the ischium and the thigh is cut with a cutter sliding along the surface of the ischium with a certain distance from the reference plane.

The invention enables the cutting with high yields without influenced by large and small of the work by positioning each ischium by pressing the face of the ischium onto the parallel guide provided under the lower side running belt through the insertion of a tilted guide along the ischium.

The ripping apparatus of thighs of the lower half body used suitably in the second process step is characterized in that it comprises:

a work transfer line for transferring the work including the hipbone and the thighs, comprising;

a conveyer with teeth for transferring by its the lower side running belt the work, the lower half body, lying in the attitude with the head side ahead and the back side down by hooking at the hipbone with the teeth, a parallel running conveyer provided under the conveyer with teeth to rip off and carry out the thighs of the work, and a parallel guide provided under the lower side running belt for clasping the hipbone together with the belt;

a means for ripping off the thighs, comprising;

a work insertion part, a back streak cut-in part for making a streak cut in the back, an ischium cutting part for cutting the connective tissues connecting the thighs and hip joints, which enable the rotation of the thighs, a hip joint dislocating part for dislocating the hip joints, which is made possible by rotation of the thighs, an articular ligament cutting part for cutting the articular ligament after the dislocation of the joints, a rump skin cutting part for cutting the rump skin by a cutter which rocks keeping a certain distance from a reference plane, and a thigh ripping part; and an inducing guide including inclined guides, which makes the connection of the ischium cutting part of the lower side running belt to the parallel running conveyer and allows the ankles to be held by the parallel runing conveyer to induce the rotation of the thighs which are rotatable owing to the cutting of the connective tissues connecting the thighs to the hipbone.

The ripping apparatus of thighs is composed so that the work transferring part is formed using the lower side running belt of the conveyer with teeth and the parallel guide plates, the hipbone of the work is introduced to the transferring part with the head side ahead and the back side down, the streak cut is executed in the back of the work with the cutter provided under the parallel guide plates right after the introduction, then the thighs are relieved of the connections to the hipbone other than the joint connections by cutting the connective tissues of the region of the hip joints at the ischium cutting part, the dislocation of the hip joints is made possible by the medium of the tilted guides, then the articular ligaments are cut, then the rump skin is pulled on the work transferring part while transferred to facilitate the rump skin cutting to realize the efficient ripping-off of the thighs.

The ischium cutting part is provided with tilted guides protruding downward from the lower side running belt and sliding cutters attached to the outsides of the guides, each of the tilted guides is inserted pressingly along the inner periphery of each slanted ischium to press the face of each ischium to each parallel guide plate, the contact face of the tilted guide to the ischium is determined as a reference plane, and the connective tissue in the hip joint region between the surface of the ischium and the thigh is cut with a cutter sliding along the surface of the ischium with a certain distance from the reference plane.

By the invention, the connective tissue in the region of each hip joint between the curved part of each ischium and the thigh are cut with a sliding cutter provided on the sides of the tilted guide which is inserted pressingly along the inner periphery of the ischium to press the face of the ischia to the parallel guide plate, so the connective tissue is cut properly and with high yields with the purpose-made cutter without influenced by large and small of the work.

The rump skin cutting part is provided with a cutter which rocks while keeping a certain distance from a reference plane for making a cut in the rump skin of the end part of the hipbone connecting the right and left thighs which are spread out in about 180 degree by the result of the cutting of the articular ligaments.

By the invention, the adhesion of the soft cartilage around the rump fat to the thigh side encountered when ripping the thighs from the hipbone is prevented, and the removal of the fat with high yields is possible.

BRIEF DESCRIPTION OF THE DRAWINGS

FIG. 4 is a view showing the relative position of the hipbone and thighs of FIG. 3; (A) is a perspective view from above the hipbone, (B) is a perspective side view.

FIG. 7 is a diagrammatic view of another conventional apparatus for ripping-off the lower half body of a slaughtered poultry showing a cut-in operation with first knives at the roots of the thighs and a cutting operation of the chords and cartilage with second knives at the roots of the thighs; (A) is a longitudinal sectional view, (B) is a transverse sectional view showing the operation with the first knives.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
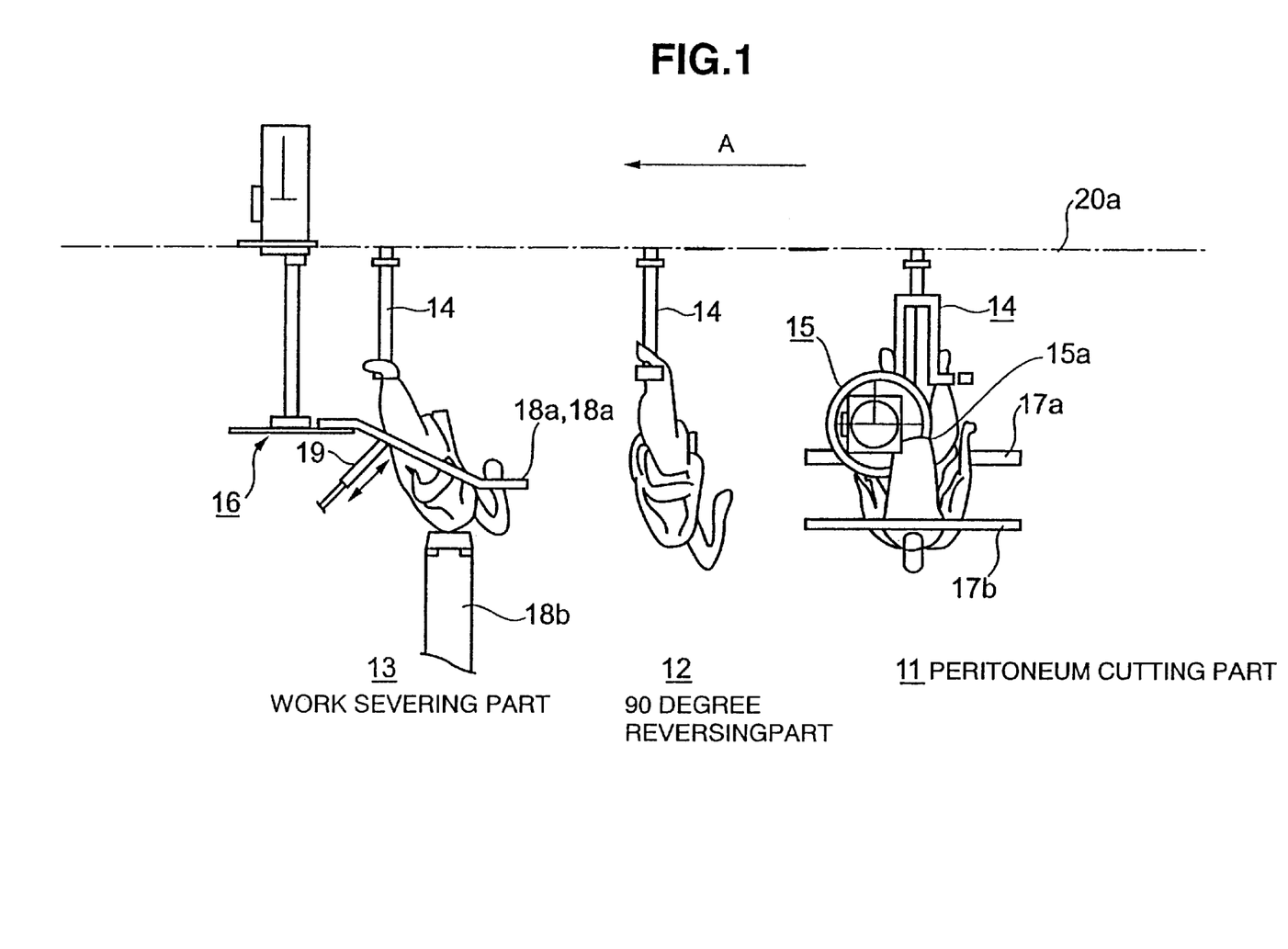
FIG. 1 is a diagrammatical representation of the operation sequence and halving apparatus of the hollowed body of a slaughtered poultry in a first process step according to the present invention.
Figure 2A:
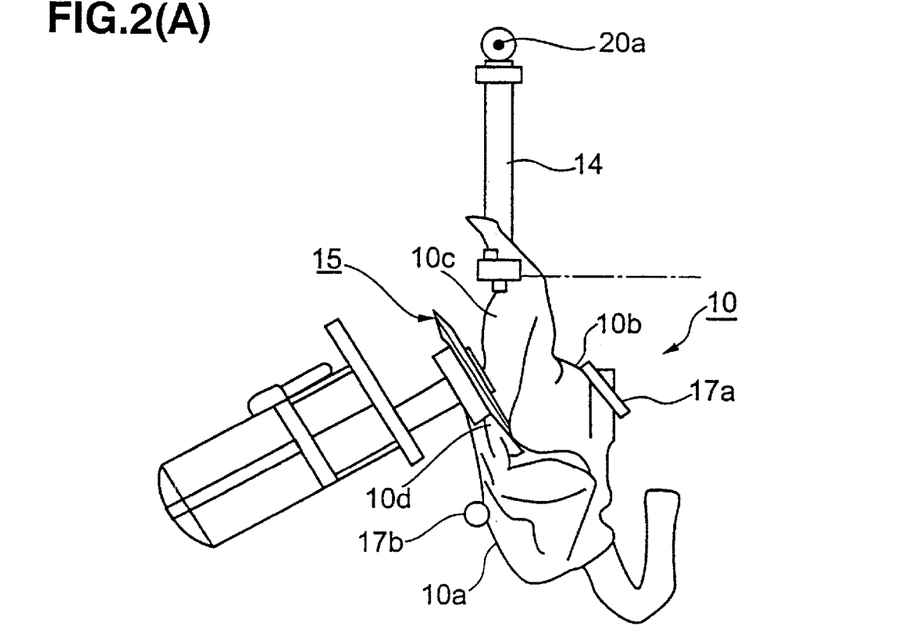
FIGS. 2(A) and (B) are diagrammatical representations showing the peritonium cutting part and work severing part of FIG. 1 respectively.
Figure 2B:
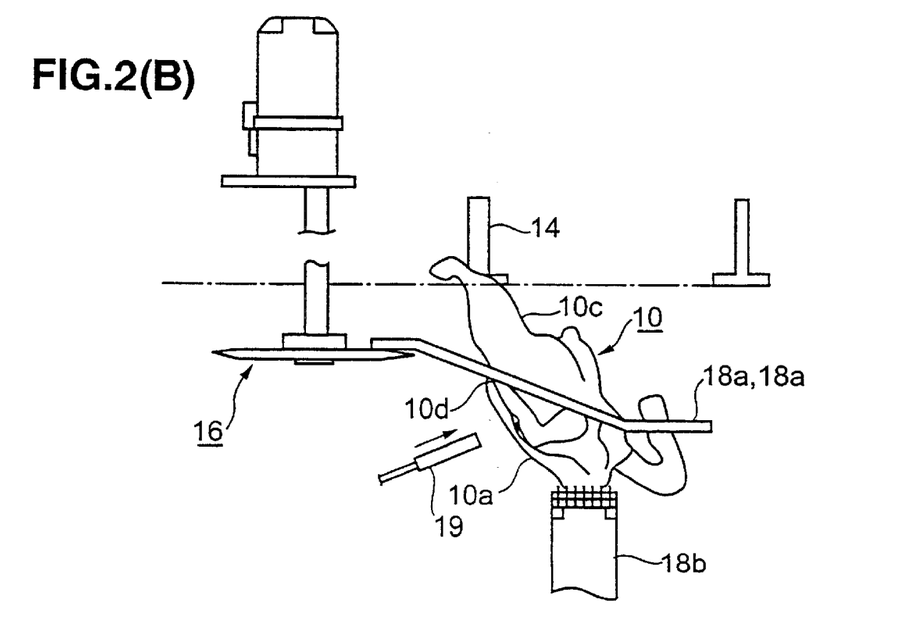

FIG. 1 is a diagrammatical representation of the operation sequence and halving apparatus of the hollowed body of a slaughtered poultry in the first process step according to the present invention. FIGS. 2(A) and (B) are diagrammatical representations showing the peritoneum cutting part and work severing part of FIG. 1 respectively.

Figure 3:
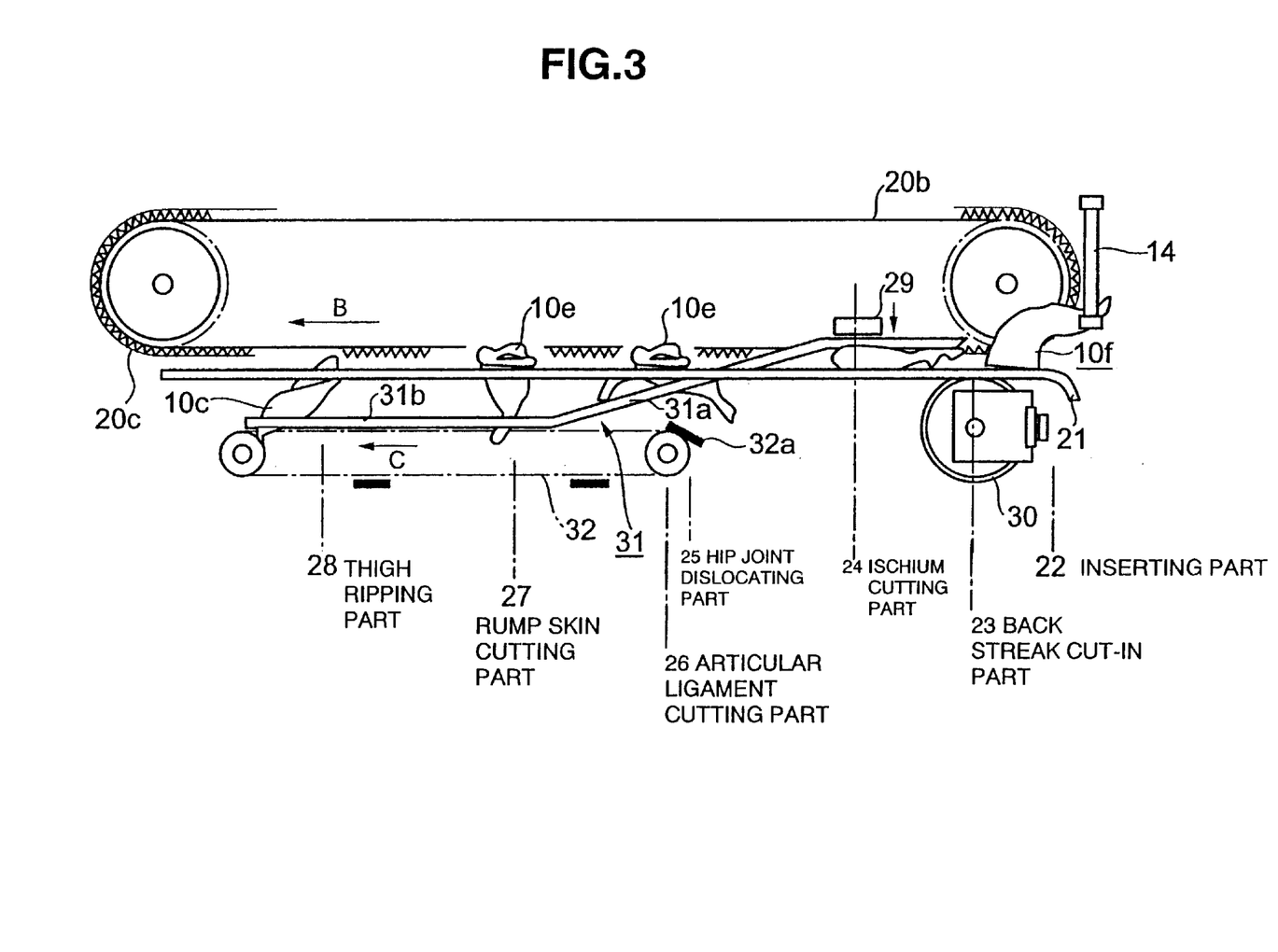
FIG. 3 is a diagrammatical representation of the ripping apparatus of the thighs of the lower half body of a slaughtered poultry in a second process step according to the present invention.
Figure 4A:
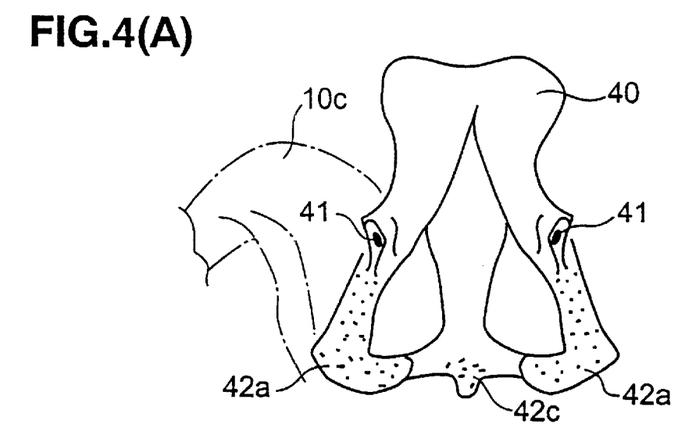
Figure 4B:
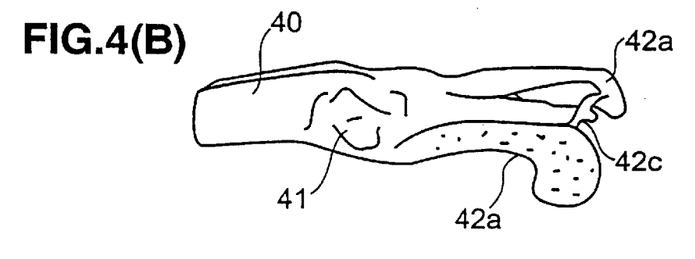
Figure 5:
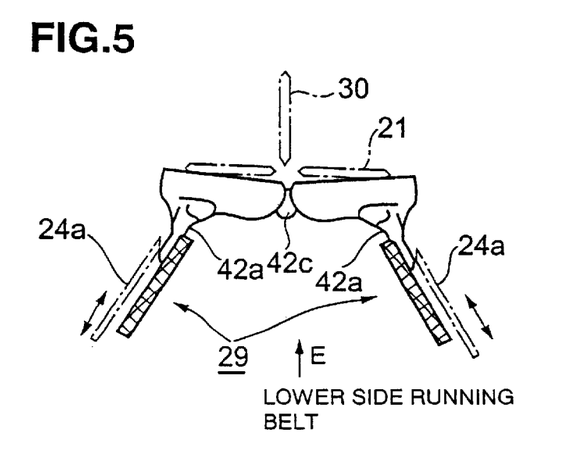
FIG. 5 is a view showing the ischium cut-in FIG. 3.

FIG. 3 is a diagrammatical representation of the ripping apparatus of the thighs of the lower half body of a slaughtered poultry in a second process step according to the present invention. FIG. 4 is a view showing the relative position of the hipbone and thighs of FIG. 3; (A) is a perspective view from above the hipbone, (B) is a perspective side view. FIG. 5 is a view showing the ischium cutting.

In FIG. 1 is shown a diagrammatic sketch of the configuration of a halving apparatus of the hollowed body of a slaughtered poultry, the first invention according to the present invention.

As shown in the drawing, the halving apparatus of the hollowed body of a slaughtered poultry of the present invention comprises a conveyer line 20a, a peritoneum cutting part 11, a 90 degree reversing part 12, and a work severing part.

The hollowed body 10 of a slaughtered poultry suspended from the conveyer line 20a by the medium of a shackle 14 for clamping the ankles is transferred in the direction of arrow A from the peritoneum cutting part 11 passing through the 90 degree reversing part 12 to the work severing part 13.

The hollowed body is rotated to take a sideways by the rotation mechanism provided on the shackle 14 for clamping the ankles at the peritoneum cutting part 11 and fixed in the sideways attitude by an integrated fixing mechanism. A streak cut 15a is made in the hollowed body 10 hanging in the sideways to the transfer direction at the peritoneum by a peritoneum cut-in mechanism.

Then, the hollowed body 10 is rotated from the sideways to the frontal to the transfer direction and fixed in the frontal attitude by the fixing mechanism.

Subsequently, at the work severing part 13, a horizontal cutter 16 is inserted in the tilted work transferring with the frontal and at the same time backward inclined position from the peritoneum cut-in part 15a. The work is tilted backward by a pair of skewed guides 18a, 18a which clasp the constricted part of the thighs and a keel guide 19 which pushes the keel as described later.

In FIG. 2(A) is shown the detail of the streak cut by the peritoneum cuting mechanism at the peritoneum cutting part 11 shown in FIG. 1. As shown in the drawing, the hollowed body 10 is suspended from the conveyer line 20a with the ankles clamped with the shackle 14 and fixed in the sideways attitude to the transfer direction. The hollowed body is pushed by the upper two-stage guide 17a and the lower two-stage guide 17b at the rump 10b and breast 10a respectively to make it to take a substantially vertical position at the parts of the thighs 10c, peritoneum 10d, and breast 10a and transferred while clasped by said the upper and the lower two-stage guides.

A skewed cutter 15 of the peritoneum cutting mechanism, the cutter facing frontally to the conveyer line 20a, is allowed to touch the peritoneum between the roots of the thighs and keel, the tip part of the breast bone, of the hollowed body 10 transferring with the vertical attitude to make a cut 15a in the peritoneum.

It is suitable that each guide 17a and 17b of the two-stage guide is formed by belt lines running parallel to the conveyer line 20a.

In FIG. 2(B) is shown the detail of the work severing part 13. As shown in the drawing, a pair of skewed guide 18a, 18a inclined upward in the direction of transfer, a pusher 18b, and a keel guide 19 are provided on the conveyer line not shown from which the hollowed body 10 clamped by the shackle 14 at the ankles is suspended, the pair of skewed guides 18a, 18a clasps the constricted part of the roots of thighs of the hollowed body 10 to cause the hollowed body to take a backward inclined attitude to form the cutting line for the horizontal cutter 16, and the extremity of the keel is pushed by the keel guide 19 to be positioned where the horizontal cutter does not interfere with the keel.

The horizontal cutter 16 is inserted from the peritoneum cut-in part 15a by the aid of the pair of skewed guide 18a, 18a and keel guide 19 to sever the work, the hollowed body, without breaking the keel. The peritoneum cut 15a is made between the roots of the thighs and the keel at the tip of the breastbone, so the breakage of the keel and mixing of its fragments into the flesh which used to occur when severing the work are completely prevented by the aid of the keel guide 19.

In FIG. 3 is shown the ripping apparatus of the thighs of the lower half body of a slaughtered poultry in the second process step according to the present invention.

As shown in the drawing, the work transfer line of the apparatus for ripping the thighs of the lower half body of a slaughtered poultry according to the present invention comprises:

a conveyer with teeth 20b running in the direction of arrow B, parallel guide plates 21, 21 provided under the lower side running belt 20c extending parallel to the belt, inclined guides 31a, 31a provided at both sides of the lower side running belt 20c and inclined to descend in the direction of downstream, parallel guides 31b, 31b provided parallel to the lower side running belt 20c and joining to the inclined guides 31a, 31a, these guides 31a and 31b forming thigh guiding members, and a thigh ripping conveyer 32 provided under the parallel guides 31b, 31b, the conveyer 32 running in the direction of arrow C with a velocity higher than that of the lower side running belt 20c.

An inserting part 22, a back streak cut-in part 23, an ischium cutting part 24, hipbone dislocating part 25, articular ligament cutting part 26, rump skin cutting part 27, and thigh ripping part 28 are provided in sequence from the entrance of the work transfer line.

The lower half body 10f of a slaughtered poultry is inserted between the lower side running belt 20c and parallel guide plates 21 with the head side of the hipbone part ahead and the back side down. The hipbone 10e of the lower half body 10f is transferred in the direction of arrow B as the lower side running belt 20c travels, and the back of the work undergoes a streak cut by a cutter 30 at the back streak cut-in part 23 while the work is transferred, and after that the connective tissues of the thighs are cut at the ishium cutting part 24.

After passing the ischium cutting part 24, the thighs 10c with the connective tissues cut are relieved of the connection to the ischia and hang down between the parallel guide plates 21 and inclined guides 31a. The hip joints of the thighs 10c are dislocated by the inclined guides 31a at the hipbone dislocating part 25, then the hip joint ligaments are cut at the hip joint ligament cutting part 26, and the ankles of the dangling thighs 10c are caught and held by chucks 32a fixed on the thigh ripping conveyer 32.

As the ankles held by the chucks are transferred in the direction of arrow C with a speed faster than the transfer speed of the hipbone 10e, the rump skin is pulled to the effect that the skin is under tension, thus the dorsal fat and rump skin are possible to be easily cut with a cutter.

The chucked ankles are pulled more and more in the direction of arrow C while it passes through the rump skin cutting part 27, and the thighs 10c are ripped off from the hipbone 10e.

FIG. 4 is a view showing the relative position of the hipbone and thighs, (A) is a perspective view from above the hipbone, (B) is a perspective side view.

As shown in FIGS. 4(A) and (B), the hipbone is shaped bilaterally symmetrical, including ilia 40, 40 in the head side, hip joint sockets 41, 41 near the center, peripheral part 42c of a caudal vertebra, and ischia 42a, 42a having obliquely curved faces on the right and left sides.

The right and left thigh 10c, 10c are connected to the ischia 42a, 42a, each having a obliquely curved face, by the connective tissue in the region of the hip joint and linked to the hipbone at the joint sockets 41, 41 near the center of the hipbone with the condyles of the thighbones by articular ligaments.

To rip off efficiently the thighs 10c composed as mentioned above, it is necessary before anything else to cut the connective tissues in the region of the hip joints on the ischia, then to dislocate the hip joints, and to cut the ligaments connecting the joint sockets and condyles of the thighbones.

In the present invention, as described above(see FIG. 3), firstly the work, the lower half body 10f including the hipbone 10e and thighs 10c, is introduced to the transfer line composed of the lower side running belt 20 and parallel guide plates 21 with the head side ahead and the back side down, and the cutting of ischia is performed when the work arrives at the ischium cutting part 24 without stopping the transfer of the work. By the cutting of ischia, the thighs 10c hang down under their own weights from the hipbone 10e, thus the initial condition for the dislocation of the hip joints is prepared. Then, the dislocation is carried out at the hipbone dislocating part 25 by the aid of the inclined guides 31a.

The cutting conditions of the connective tissues in the hip joint region between ischia 42a, 42a and thighs 10c at the ischium cutting part 24 is shown in FIG. 5. Tilted guides 29, 29 are moved down along the slanted inner peripheries of the ischia 42a, 42a in the direction of arrow E as shown in FIG. 5(the drawing is represented inversely, i.e. upside down) while the ischia are transferred, and the tilted guides 29, 29 press the faces of the ischia 42a,42a to the parallel guide plates 21, 21 to fix the ischia 42a, 42a.

Then, the connective tissues in the hip joint region are cut with high yields with sliding cutters 24a, 24a sliding along the tilted guides 29, 29 to free the thighs which have been connected to the ischia.

The rocking cutter 30 is inserted into the peripheral part 42c of the caudal vertebra where the back part of the hipbone is connected to the right and left thigh to facilitate the ripping of the thighs and to enable the removal with high yields.

With the configuration described above, the halving method of the hollowed body of a slaughtered poultry of the first invention according to the present invention makes possible the separation of the thighs from the roots while always preventing the breakage of the keel and contributes to the improvement of yields.

Further, the ripping method of the lower half body of the second invention makes possible the efficient ripping of the thighs, in which the efficient cutting of the connective tissues on the thighs and ischia and the efficient dislocation of the hip joints is made possible while preventing the remaining of dorsal fat on the hipbone when ripping the thighs.

What is claimed:

1. An apparatus for separating the meat of a poultry carcass by a first process step comprising separating the hollowed body of a slaughtered poultry carcass into a lower half body including the thighs and a part of the back and an upper half body including the breast inclusive of the ribs and the remaining part of the back, and a second process step comprising ripping the thighs off the separated lower half body, wherein the apparatus used in the first process step comprises:

a conveyer line for transferring the poultry carcass clamped by the legs and suspended from the conveyer;

an ankle holding shackle for clamping the legs, the shackle being provided with a rotation and fixing mechanism which rotates the poultry carcass from a frontal orientation to a sideways orientation and from the sideways orientation to the frontal orientation and fixes the poultry carcass at the position where rotation of the shackle is stopped;

a peritoneum cutting mechanism comprising a two-stage guide for making the sideways oriented poultry carcass take an upright attitude in which a line along the thigh through the abdomen to the breast is substantially vertical, and a tilted cutter for making a cut in the peritoneum between the keel and the thighs of the upright poultry carcass; and a poultry carcass severing mechanism comprising a pair of skewed guides slanted upward in the transfer direction of the conveyer and clasping the constricted part of the roots of the thighs for allowing the poultry carcass to take a backward tilting attitude to keep horizontal the halving separation plane determined by the peritoneum cut, a pusher for pushing up the upper half body at its end part; a horizontal cutter for performing the halving separation, and a keel guide for guiding the keel downward to avoid breakage of the keel by the cutter.

2. An apparatus for separating the meat of a poultry carcass according to claim 1, wherein the two-stage guide comprises an upper guide and a lower guide for clasping the rump and breast part provided parallel to the conveyer line.

3. An apparatus for separating the meat of a poultry carcass according to claim 1, wherein the two-stage guide is formed of running belts which clasp the rump and breast part and travel at the same speed as the conveyer line.

4. A method of separating the meat of a poultry carcass comprising a first process step comprising separating the hollowed body of a slaughtered poultry carcass into the lower half body including the thighs and a part of the back and the upper half body including the breast inclusive of the ribs and the remaining part of the back, and a second process step comprising ripping off the thighs of the separated lower half body, wherein the second process step is performed by:

introducing the lower half body between the lower side running belt of a toothed conveyer and a pair of parallel guide plates, with the head end of the lower half body forward and the back side down;

cutting a streak cut in the back side of the lower half body with a vertical cutter provided under the pair of parallel guide plates;

then cutting the ischia at an ischium cutting part for cutting the connective tissues in the hip joint region between the side faces of the ischia and the roots of the thighs guided by tilted plates inserted from above along the inner peripheries of the ischia;

dislocating the hip joints by a pair of inclined guides which cause the thighs to be rotated around the hip joints;

cutting the articular ligaments between the ilia and the thighbone;

cutting and rotating the rump skin of each thigh near the tail vertebra along each hipbone after each ankle is held by a chuck fixed to a conveyer running parallel to the toothed conveyer in the most lower part; and following completion of the cutting operations, ripping off the thighs by the conveyer running parallel to the toothed conveyer in the most lower part.

5. A method of separating the meat of a poultry carcass according to claim 4, wherein the ischium is cut in such a manner that the contact face of each tilted guide inserted along the inner periphery of each slanted ischium for pressing the face of the ischium against the parallel guide plate is determined as a reference plane, and the connective tissue in the hip joint region between the surface of the ischium and the thigh is cut with a cutter sliding along the surface of the ischium spaced a predetermined distance from the reference plane.

6. An apparatus for separating the meat of a poultry carcass by a first process step comprising separating the hollowed body of a slaughtered poultry carcass into a lower half body including the thighs and a part of the back and an upper half body including the breast inclusive of the ribs and the remaining part of the back, and a second process step comprising ripping off the thighs of the separated lower half body, wherein the apparatus used in the second process step comprises:

a lower half body transfer line for transferring the lower half body including the hipbone and the thighs, comprising:

a toothed conveyer with a lower side running belt for transferring the lower half body with the head end forward and the back side down by hooking at the hipbone with the conveyer teeth, a parallel running conveyer provided under the toothed conveyer to rip off and carry away the thighs of the lower half body, and a parallel guide provided under the lower side running belt for clasping the hipbone together with the belt;

a means for ripping off the thighs, comprising:

a work insertion part, a back streak cut-in part for making a streak cut in the back, an ischium cutting part for cutting the connective tissues connecting the thighs and hip joints to facilitate rotation of the thighs, a hip joint dislocating part for dislocating the hip joints by rotation of the thighs, an articular ligament cutting part for cutting the articular ligament after the dislocation of the hip joints, a rump skin cutting part for cutting the rump skin with a cutter which rocks keeping a certain distance from a reference plane, and a thigh ripping part; and a thigh rotation inducing guide including inclined guides, which connects the ischium cutting part of the lower side running belt to the parallel running conveyer and allows the ankles to be held by the parallel running conveyer to induce rotation of the thighs which are rotatable owing to the cutting of the connective tissues connecting the thighs to the hipbone.

7. An apparatus for separating the meat of a poultry carcass according to claim 6, wherein the ischium cutting part is provided with tilted guides protruding downward from the lower side running belt and sliding cutters attached to the outsides of the guides, each of the tilted guides are inserted pressingly along the inner periphery of each slanted ischium to press the face of each ischium to a respective parallel guide plate, the contact face of the tilted guide to the ischium is determined as a reference plane, and the connective tissue in the hip joint region between the surface of the ischium and the thigh is cut with a cutter sliding along the surface of the ischium spaced a predetermined distance from the reference plane.

8. An apparatus for separating the meat of a poultry carcass according to claim 7, wherein the rump skin cutting part is provided with a cutter which rocks while keeping a certain distance from a reference plane for making a cut in the rump skin of the end part of the hipbone connecting the right and left thighs which are spread out at about 180 degrees as a result of cutting the articular ligaments.

* * * * *